United States Patent
DeLuca et al.

(10) Patent No.: US 10,318,338 B2
(45) Date of Patent: Jun. 11, 2019

(54) RE-LAUNCHING CONTEXTUALLY RELATED APPLICATION SETS

(71) Applicant: International Business Machines Corporation, Armonk, NY (US)

(72) Inventors: Lisa Seacat DeLuca, Baltimore, MD (US); Geetika T. Lakshmanan, Winchester, MA (US); Dana L. Price, Surf City, NC (US); Shelbee D. Smith-Eigenbrode, Thorton, CO (US)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 14/592,075

(22) Filed: Jan. 8, 2015

(65) Prior Publication Data

US 2016/0203018 A1  Jul. 14, 2016

(51) Int. Cl.
G06F 9/46 (2006.01)
G06F 9/48 (2006.01)
H04L 29/08 (2006.01)

(52) U.S. Cl.
CPC ........... *G06F 9/461* (2013.01); *G06F 9/48* (2013.01); *G06F 9/485* (2013.01); *H04L 67/1097* (2013.01); *H04L 67/30* (2013.01); *H04L 67/145* (2013.01)

(58) Field of Classification Search
CPC ...... G06F 9/461; G06F 17/30884; G06F 9/48; G06F 9/485; H04L 67/1097; H04L 67/30; H04L 67/145
USPC .......................................................... 718/108
See application file for complete search history.

(56) References Cited

U.S. PATENT DOCUMENTS

| | | | |
|---|---|---|---|
| 5,355,490 A | 10/1994 | Kou | |
| 8,341,175 B2* | 12/2012 | Perantatos | G06F 17/30011 707/766 |
| 8,429,546 B2* | 4/2013 | Hilerio | G06F 3/0481 715/760 |
| 9,858,092 B2* | 1/2018 | Hobbs | G06F 9/44505 |
| 2003/0063122 A1* | 4/2003 | Cichowlas | G06F 9/485 715/760 |

(Continued)

FOREIGN PATENT DOCUMENTS

| | | |
|---|---|---|
| WO | 2009059213 A2 | 5/2009 |
| WO | 2011011120 A2 | 1/2011 |

OTHER PUBLICATIONS

Costello, Sam, "How iPhone Multitasking Works—And How to Use It", About.com, about technology, provided by inventors on Nov. 8, 2013, © 2014 About.com, <http://ipod.about.com/od/usingios4/qt/How-Iphone-Multitasking-Works.htm>.

(Continued)

*Primary Examiner* — James J Lee
*Assistant Examiner* — Willy W Huaracha
(74) *Attorney, Agent, or Firm* — Alexa L. Ashworth; Brian M. Restauro

(57) ABSTRACT

Embodiments of the present invention provide methods, systems, and computer program products for re-launching contextually related application sets. In one embodiment, applications which are contextually-related are saved to a profile, along with the state of each application and data associated with each application. The set of applications, along with saved state and data, can be re-launched responsive to a trigger.

17 Claims, 7 Drawing Sheets

(56) References Cited

U.S. PATENT DOCUMENTS

| | | | | |
|---|---|---|---|---|
| 2004/0044721 | A1* | 3/2004 | Song | H04L 29/06 709/202 |
| 2006/0184535 | A1* | 8/2006 | Kaluskar | G06F 17/30289 |
| 2010/0223498 | A1 | 9/2010 | Schlesinger et al. | |
| 2012/0005596 | A1* | 1/2012 | Carlson | G06F 9/445 715/751 |
| 2012/0179706 | A1* | 7/2012 | Hobbs | G06F 9/44505 707/769 |
| 2012/0216124 | A1* | 8/2012 | Martino | H04L 65/1069 715/739 |
| 2013/0014131 | A1* | 1/2013 | Bao | G06F 9/461 719/320 |
| 2013/0204622 | A1* | 8/2013 | Lu | G06F 3/167 704/251 |
| 2014/0280579 | A1* | 9/2014 | Auger | H04L 67/306 709/204 |
| 2014/0358970 | A1* | 12/2014 | Morris | G06F 17/30392 707/772 |
| 2014/0366038 | A1* | 12/2014 | McKeown | G06F 9/461 718/108 |

OTHER PUBLICATIONS

Internet Society et al., "Device Reset Characterization (RFC6201)", An IP.com Prior Art Database Technical Disclosure, Original Publication Date: Mar. 1, 2011, IP.com No. IPCOM000205349D, IP.com Electronic Publication: Mar. 28, 2011, Copyright (c) 2011 IETF Trust and the persons identified as the, <http://ip.com/IPCOM/000205349>.

"Quit Multiple Apps At Once on iPhone & iPad Using Multitouch in iOS 6", Aug. 11, 2012 OSXDaily, © OS X Daily, <http://osxdaily.com/2012.08/11/quit-multiple-apps-at-once-ios/>.

"System and Methods for Record & Replay of Web-based Mobile Tasks", An IP.com Prior Art Database Technical Disclosure, IP.com No. IPCOM000198571D, IP.com Electronic Publication: Aug. 9, 2010, Copyright © 2010 DOCOMO Communications Laboratories USA, Inc., <http://ip.com/IPCOM/000198571>.

* cited by examiner

PROFILE 300

WEBPAGE 302

FLIGHT INFO AS OF NOV. 18

ROUND TRIP: NEW YORK CITY, NY TO MIAMI, FL

DEPART: DEC. 2

1:45 PM $400.00

WEATHER APPLICATION 304

MIAMI, FL
FORECAST FOR TODAY:
NOV. 18

78°

PARTLY CLOUDY

FIG. 3A

PROFILE 301

WEBPAGE 306

FLIGHT INFO AS OF NOV. 18

ROUND TRIP: NEW YORK CITY, NY TO ANCHORAGE, AK

DEPART: DEC. 31

10:45 AM

ACT NOW! LAST DAY PRICE REDUCTION!

$900.00

WEATHER APPLICATION 308

ANCHORAGE, AK
FORECAST FOR TODAY:
NOV. 18

28°

CLOUDY

FIG. 3B

RE-LAUNCHING CONTEXTUALLY RELATED APPLICATION SETS

BACKGROUND OF THE INVENTION

The present invention relates generally to the field of application management, and more particularly to re-launching contextually related application sets on a computing device.

Computing systems, such as for a mobile device, often allow users to switch between multiple applications in order to accomplish an end-to-end task, such as reading an e-mail, checking a calendar entry, and then sending a reply e-mail or text message. Mobile users may be interrupted during the task, for example, ending a browsing session to answer a phone call. Some device systems aid users in completing multiple tasks by allowing a user to hibernate certain applications to free up system resources, or by allowing a user to select an application to run in the background when switching to a different foreground application.

SUMMARY OF THE INVENTION

According to one embodiment of the present invention, a method for re-launching contextually related application sets is provided. The method includes: receiving, on a computing device, a first set of one or more contextually-related applications; saving, by one or more processors, the first set of the contextually-related applications as a first profile; receiving, by one or more processors, a trigger to launch the first set of the one or more contextually-related applications; and in response to receiving a trigger to launch the first set of the one or more contextually-related applications, launching the first set of the one or more contextually-related applications on the computing device.

According to another embodiment of the present invention, a computer program product for re-launching contextually related application sets is provided. The computer program product comprises a computer readable storage medium and program instructions stored on the computer readable storage medium. The program instructions include: program instructions to receive a first set of one or more contextually-related applications; program instructions to save the first set of the contextually-related applications as a first profile; program instructions to receive a trigger to launch the first set of the one or more contextually-related applications; and in response to receiving a trigger to launch the first set of the one or more contextually-related applications, program instructions to launch the first set of the one or more contextually-related applications on the computing device.

According to another embodiment of the present invention, a computer system for re-launching contextually related application sets is provided. The computer system includes one or more computer processors, one or more computer readable storage media, and program instructions stored on the one or more computer readable storage media for execution by at least one of the one or more processors. The program instructions include: program instructions to receive a first set of one or more contextually-related applications; program instructions to save the first set of the contextually-related applications as a first profile; program instructions to receive a trigger to launch the first set of the one or more contextually-related applications; and in response to receiving a trigger to launch the first set of the one or more contextually-related applications, program instructions to launch the first set of the one or more contextually-related applications on the computing device.

BRIEF DESCRIPTION OF THE DRAWINGS

FIGS. 3A and 3B illustrate an example of a set of saved applications with updated data from the original source when re-launched on a computing device, in accordance with an embodiment of the present invention;

DETAILED DESCRIPTION OF THE PREFERRED EMBODIMENTS

Mobile device users often implement multiple applications in one task session which may be contextually related, for example, sending an e-mail about an upcoming trip, checking a calendar for available dates for the trip, and searching online for plane tickets for the same trip. Some systems allow a user to suspend the current state of an application and to later return to the same state. Embodiments of the present invention provide systems and methods for allowing a user to save a contextually-related combination of applications and to later access the same combination of applications, including shared or transferred data between each of the applications that are saved.

Figure 1:
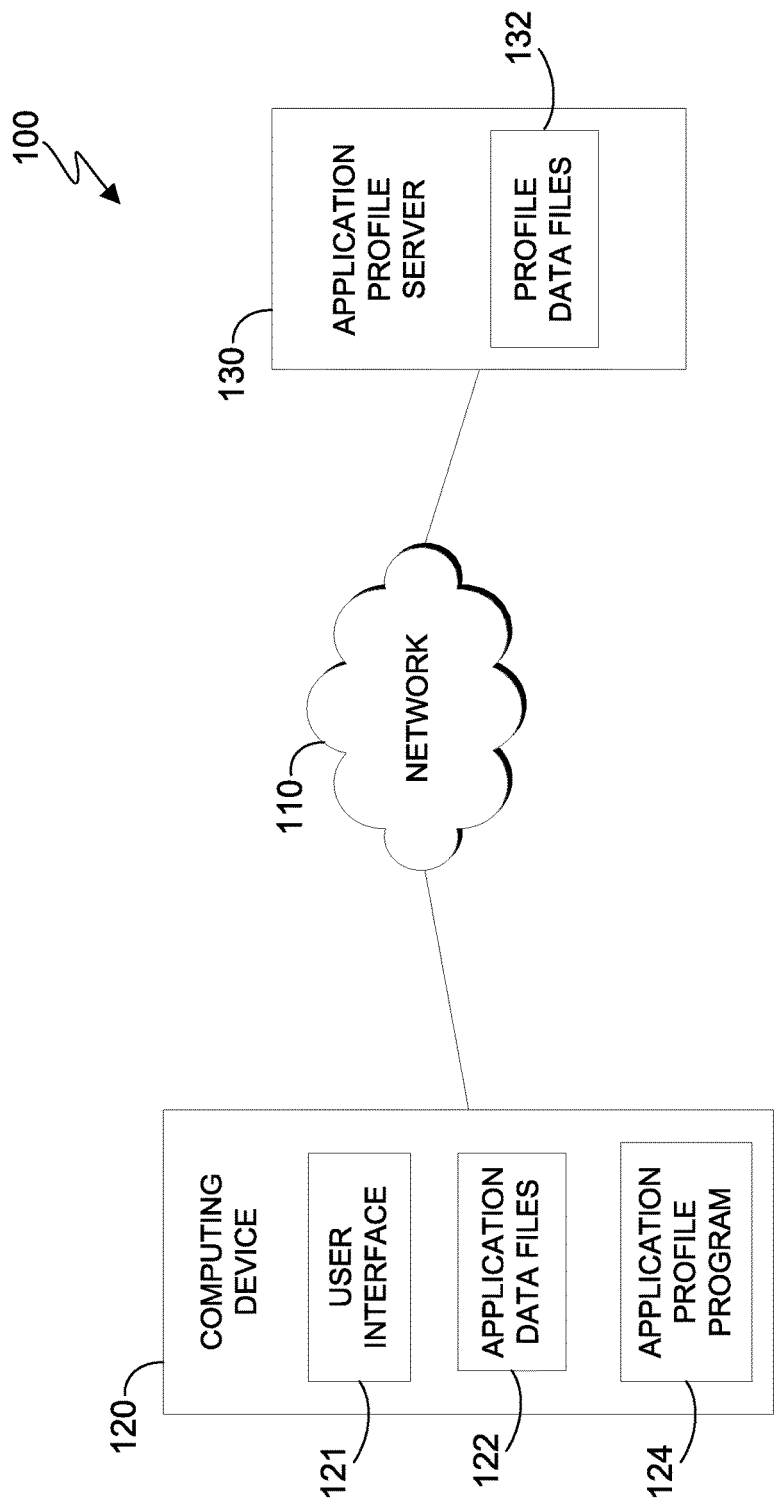
FIG. 1 is a functional block diagram illustrating a computing environment, in accordance with an embodiment of the present invention.

The present invention will now be described in detail with reference to the Figures. FIG. 1 is a functional block diagram illustrating computing environment 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention, as recited by the claims. In an exemplary embodiment, computing environment 100 includes computing device 120 and application profile server 130, all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication between computing device 120 and application profile server 130.

Application profile server 130 contains profile data files 132. Application profile server 130 may be a management server, a web server, or any other electronic device or computing system capable of receiving and sending data. In other embodiments, application profile server 130 can be a laptop computer, a tablet computer, a netbook computer, a personal computer (PC), a desktop computer, a personal digital assistant (PDA), a smart phone, or any programmable electronic device capable of communicating with computing device 120 via network 110, and with various components and devices within computing environment 100. In other embodiments of the present invention, application profile server 130 can represent a computing system utilizing clustered computers and components to act as a single pool of seamless resources when accessed through a network. Application profile server 130 may include internal and external hardware components, as depicted and described in further detail with respect to FIG. 4.

Profile data files 132 includes information detailing a group of one or more contextually-related applications which comprise a profile. Applications may be, for example, a webpage or a software program used on a mobile or computing device, which may include a text message, an e-mail, a document, and user settings, among other programs which may be executed on computing device 120. One or more contextually-related applications are saved together as a profile, and may later be accessed by a user in the same grouping. For example, a user may save one or more applications associated with a planned vacation as, for example, "Miami trip" or applications associated with a work presentation as, for example, "New Hire Orientation." In this exemplary embodiment, profile data files 132 includes information such as, application names, web browser URLs, date and time information, text message, and e-mail information, among other information, for each saved application in a profile.

Computing device 120 includes user interface (UI) 121, application data files 122, and application profile program 124. Computing device 120 may be a laptop computer, a tablet computer, a netbook computer, a personal computer (PC), a desktop computer, a personal digital assistant (PDA), a smart phone, a thin client, or any programmable electronic device capable of communicating with application profile server 130 via network 110. Computing device 120 may include internal and external hardware components, as depicted and described in further detail with respect to FIG. 4.

UI 121 may be, for example, a graphical user interface (GUI) or a web user interface (WUI) and can display text, documents, web browser windows, user options, application interfaces, and instructions for operation and includes the information (e.g., graphic, text, and sound) a program presents to a user, and the control sequences the user employs to control the program. In this exemplary embodiment, UI 121 allows a user to interact with application profile program 124 through electronic devices, such as a computer keyboard and/or cursor control devices, such as a computer mouse or touchpad, and through graphical icons and visual indicators.

Application data files 122 includes information detailing the applications which are launched and operated by a user. In this exemplary embodiment, application data files 122 includes detailed information about each application, such as application names, web browser URLs, date and time information, and text message and e-mail information, among other information. Application data files 122 are stored on computing device 120, and may be retrieved by application profile program 124 when a user is creating a profile on computing device 120.

In this exemplary embodiment, application profile program 124 is a software application capable of receiving information, such as a user input or request, via UI 121. Although depicted as a separate component, in an embodiment, application profile program 124 may be partially or fully integrated with UI 121. In this exemplary embodiment, application profile program 124 is capable of communicating with application profile server 130 and retrieving information, such as profile data files 132, via network 110. Application profile program 124 is capable of accessing and saving the information related to each application as application data files 122, retrieving updates to application information from the application source (not shown in FIG. 1) via network 110, detecting context and contextually-related applications within the context, storing the profile information as profile data files 132, and communicating with UI 121 and/or external devices.

Figure 2:
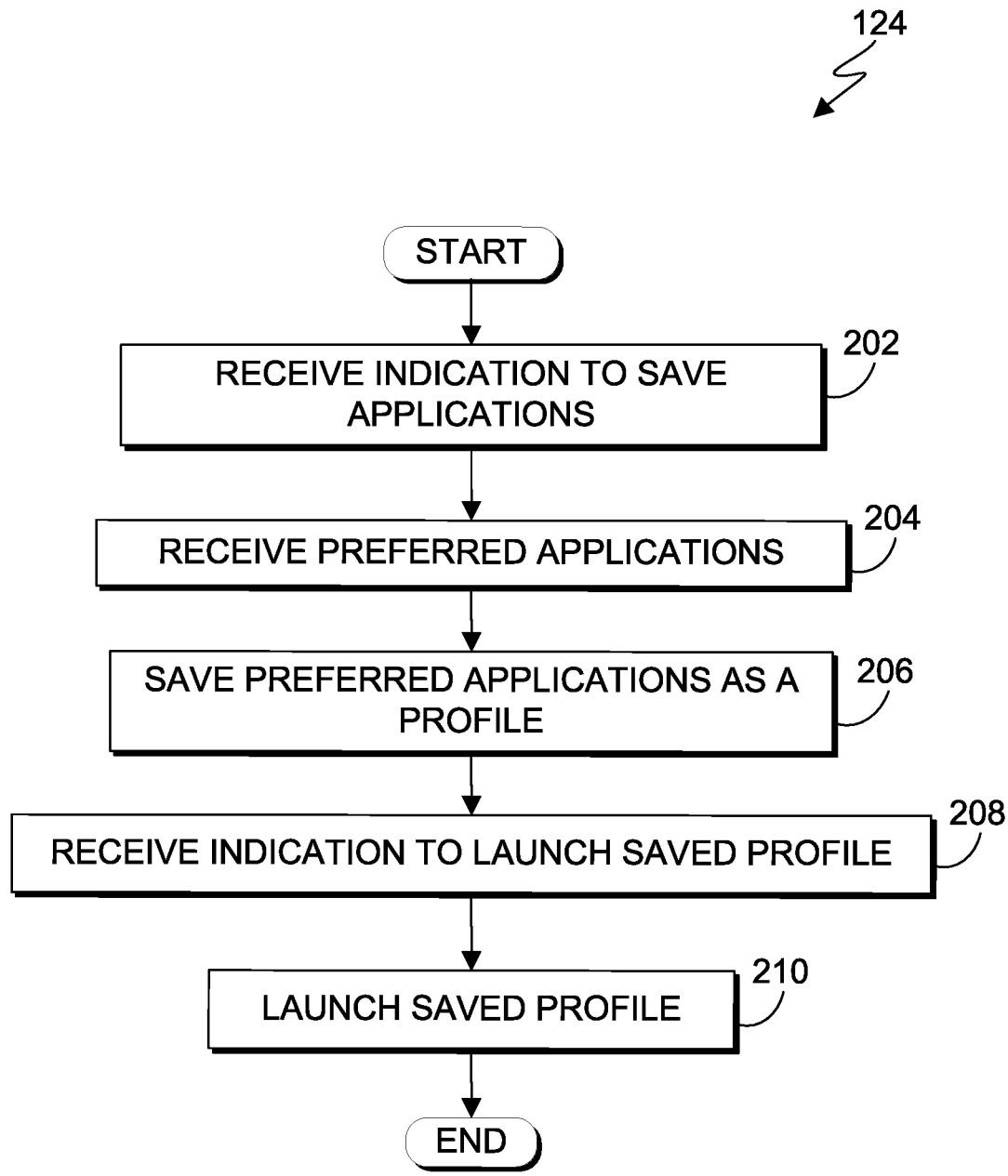
FIG. 2 is a flowchart illustrating operational steps for saving an application profile according to user preferences, in accordance with an embodiment of the present invention.

FIG. 2 is a flowchart depicting operational steps for application profile program 124 to save a contextually-related application profile according to user preferences, in accordance with an embodiment of the present invention.

In step 202, application profile program 124 receives an indication to save a current state of one or more applications. The state of an application is the information that is necessary to revert an application from a starting state to the state it is at when the user requests a save. For example, the state of an e-mail application may be the information that is necessary to revert to a particular e-mail from a friend sent two months ago. In this exemplary embodiment, the indication received by application profile program 124 to save the current state of one or more applications is automatic. For example, application profile program 124 may detect that it has not received any movements or interactions with the user interface of a device for a certain period of time (i.e., time-out period), and save the current state of each running application. In another example, application profile program 124 may be triggered to save the current state of each running application responsive to a user pressing the lock button on a mobile device screen. In yet another example, application profile program 124 may automatically save the current state of an application based on a user preference, such as the time of day or a day of the week. In other embodiments, the indication to save the current state of one or more applications is manually received from a user of the computing device. For example, a user executing multiple applications associated with a planned vacation, such as viewing an e-mail, searching via a flight booking website, and viewing details in a weather application, may choose to save the state of the applications together as a profile (e.g., "Miami trip"). Any number of contextually-related applications in which the system is capable of running simultaneously may be saved to the same profile. In yet another embodiment, a user may manually choose to exclude certain applications from triggering application profile program 124 to save the current state of each application. For example, if a user is watching a video on a mobile device, they may not want application profile program 124 to save the current state when they do not interact with the device for an extended period of time. A user may continually modify the preferences of how, and for which applications, application profile program 124 is triggered to save the current state of applications.

In step 204, application profile program 124 receives the state of a set of preferred applications from a user. In this exemplary embodiment, responsive to application profile program 124 receiving an indication to save a state of one or more applications, application profile program 124 instructs a user to manually select from the one or more applications to include in the saved profile. For example, application profile program 124 may indicate to the user to select which applications from a set of currently running applications to save to a profile. In another embodiment, application profile program 124 automatically receives each application in use as a preferred application, responsive to receiving an indication to save the state of the applications. In yet another embodiment, application profile program 124 instructs a user to choose a subset of applications from any application that may be executed on the device. For example, a user may choose to save a currently open web URL, and a URL to a favorite website which is not currently in use. A user may continually modify the preferences of how application profile program 124 receives the current set of applications.

In step 206, application profile program 124 saves the state of the set of preferred applications as a profile. In this exemplary embodiment, application profile program 124 saves the state of the set of preferred applications, as well as information related to each application, as profile data files 132 on application profile server 130. In other embodiments, application profile program 124 saves the state of the set of preferred applications as a profile locally, on computing device 120.

In step 208, application profile program 124 receives an indication to launch the saved profile containing the state of the applications, as well as the data associated with each application. The data associated with each application may include search criteria, keywords, and data input, among other data. Responsive to receiving an indication from a user (i.e., manual or automatic), application profile program 124 launches the selected profile. In one embodiment, application profile program 124 re-launches the saved applications associated with a saved profile when a user reverts back to, or re-launches, one of the applications in the saved profile. In another embodiment, application profile program 124 re-launches the saved state of the applications associated with a profile when a user launches an application which application profile program 124 recognizes as contextually-related to a saved state of an application. For example, application profile program 124 may recognize an e-mail from a friend containing potential dates for a trip to Miami as contextually-related when those dates and destination (Miami) are entered into a flight booking website by the user. In response to a user entering the contextually-related information into the flight booking website, application profile program 124 may re-launch the e-mail from the friend. In other embodiments, a user manually selects to open the combination of previously used applications, based on a previous manual save by the user. In yet another embodiment, application profile program 124 is prompted to re-launch a saved profile, responsive to a user launching an application associated with one of the applications in the saved state. For example, if a user launches a flight searching website, and begins searching for "flights to Miami," then application profile program 124 automatically launches the state of each saved application in a profile associated with "flights to Miami," while if a user begins searching for "flights to Alaska," then application profile program 124 automatically launches the state of each saved application of a profile associated with "flights to Alaska."

In step 210, application profile program 124 launches the saved profile, including the saved state of each contextually-related application associated with the saved profile. In this exemplary embodiment, each contextually-related state of an application which is saved to the profile is launched, and each application associated with the saved profile is able to operate simultaneously. Furthermore, each application which is saved to a profile is updated using the current data from the original source (i.e., the search destination). For example, a user browsing a clothing website and subsequently saving the state of the website to a profile would be directed back to a page on the clothing website displaying, for example, swimsuits, if a "Miami trip" profile is later triggered, or directed back to a page on the clothing website displaying, for example, winter coats, if an "Alaska trip" profile is subsequently triggered.

Accordingly, by performing the operational steps of FIG. 2, contextually-related applications that are part of an end-to-end task may be saved to a profile by a user, and later re-launched when the user wants to complete the task. By repeatedly performing the operational steps of FIG. 2, a user may build one or more unique contextually-related application profiles which may be used to perform multiple end-to-end tasks.

FIGS. 3A and 3B illustrate an example of the state of a set of saved applications with updated data from the original source when re-launched on computing device 120, in accordance with an embodiment of the present invention.

As depicted in FIG. 3A, profile 300 includes two applications, webpage 302 and weather application 304, which are re-launched responsive to an indication, such as searching a flight booking website for flights to Miami. The state of information associated with each of webpage 302 and weather application 304 as of the date profile 300 was created is saved as profile data files 132 (i.e., step 206 of FIG. 2). Upon re-launching the contextually-related applications, the information the user was accessing at the time the applications were saved is also re-launched. In addition, the information associated with each application is updated from the source to the current information as of the date and time of the re-launch (i.e., November 18). For example, the flight search criteria (i.e., round trip flight from New York to Miami, leaving on December 2 at 1:45 PM) of webpage 302 in FIG. 3A is saved (on an earlier date than November 18), and the same flight search criteria is opened, with the updated current data, at the time of re-launching the application (i.e., November 18), while the user-selected city (i.e., Miami) of weather application 304 in FIG. 3A is saved, and the same user-selected city is opened, with the updated current weather information, at the time of re-launching weather application 304 (i.e., November 18).

Referring now to FIG. 3B, upon re-launching profile 301 (i.e., step 210 of FIG. 2), which is re-launched responsive to an indication, such as searching a flight booking website for flights to Anchorage, each contextually-related application (i.e., webpage 306 and weather application 308) and the information associated with profile 301, that the user was accessing at the time the applications were saved (i.e., state of the applications), is also re-launched. In addition, the information associated with each application is updated from the original source to the current information as of the date and time of the re-launch (i.e., November 18). For example, the flight search criteria (i.e., round trip flight from New York City, N.Y. to Anchorage, Ak., leaving on December 31 at 10:45 AM) of webpage 306 in FIG. 3B is saved, and the same flight search criteria, with the updated current data (i.e., as of November 18), is re-launched when triggered, while the user-selected city (i.e., Anchorage, Ak.) of weather application 308 in FIG. 3B is saved, and the same user-selected city is re-launched, with the updated current weather information (i.e., as of November 18). The content of webpage 306 is also updated, indicating a current sale on airplane tickets (i.e., as of November 18), and the current weather, indicated by weather application 308, is updated to the current weather information for the user-selected city at the time of re-launching weather application 308 (i.e., November 18).

Figure 4:
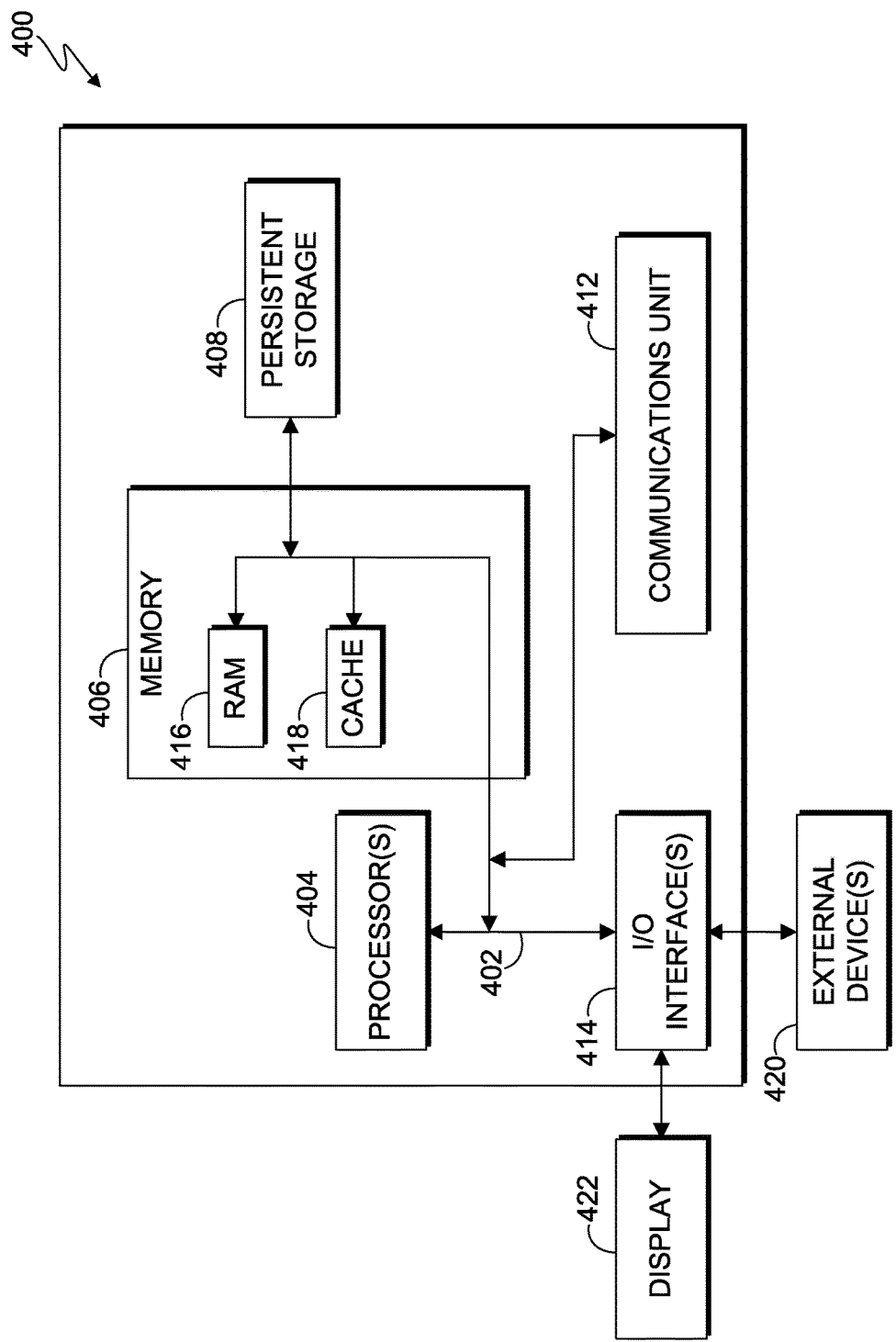
FIG. 4 is a block diagram of internal and external components of a computing device, in accordance with an embodiment of the present invention.

FIG. 4 depicts a block diagram of components of computing device 120 and application profile server 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 120 and application profile server 130 include communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media.

Application data files 122 and application profile program 124 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices, including computing device 120 and application profile server 130. In these examples, communications unit 412 includes one or more network interface cards. Communications unit 412 may provide communications through the use of either or both physical and wireless communications links. Application profile program 124 may be downloaded to persistent storage 408 through communications unit 412.

I/O interface(s) 414 allows for input and output of data with other devices that may be connected to computing device 120. For example, I/O interface 414 may provide a connection to external device(s) 420 such as a keyboard, keypad, a touch screen, and/or some other suitable input device. External device(s) 420 can also include portable computer readable storage media such as, for example, thumb drives, portable optical or magnetic disks, and memory cards. Software and data used to practice embodiments of the present invention, e.g., application data files 122 and application profile program 124, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor or an incorporated display screen, such as is used in tablet computers and smart phones.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
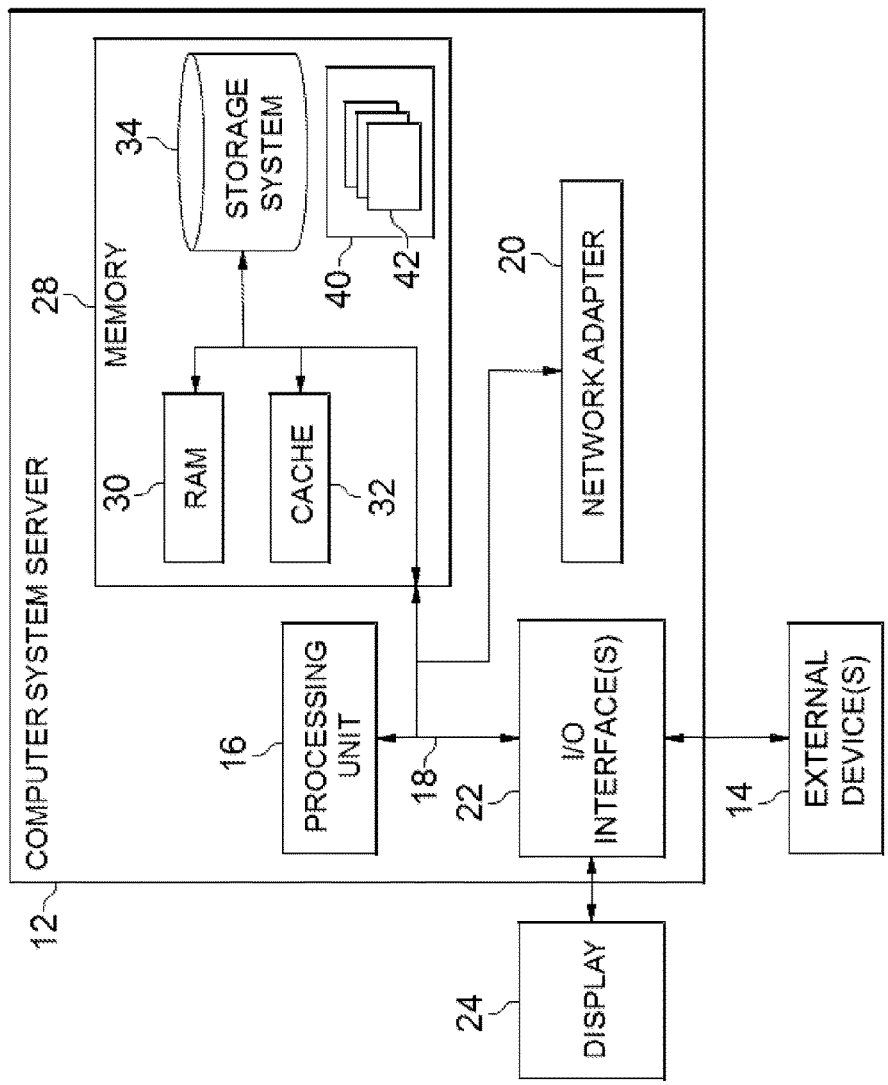
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
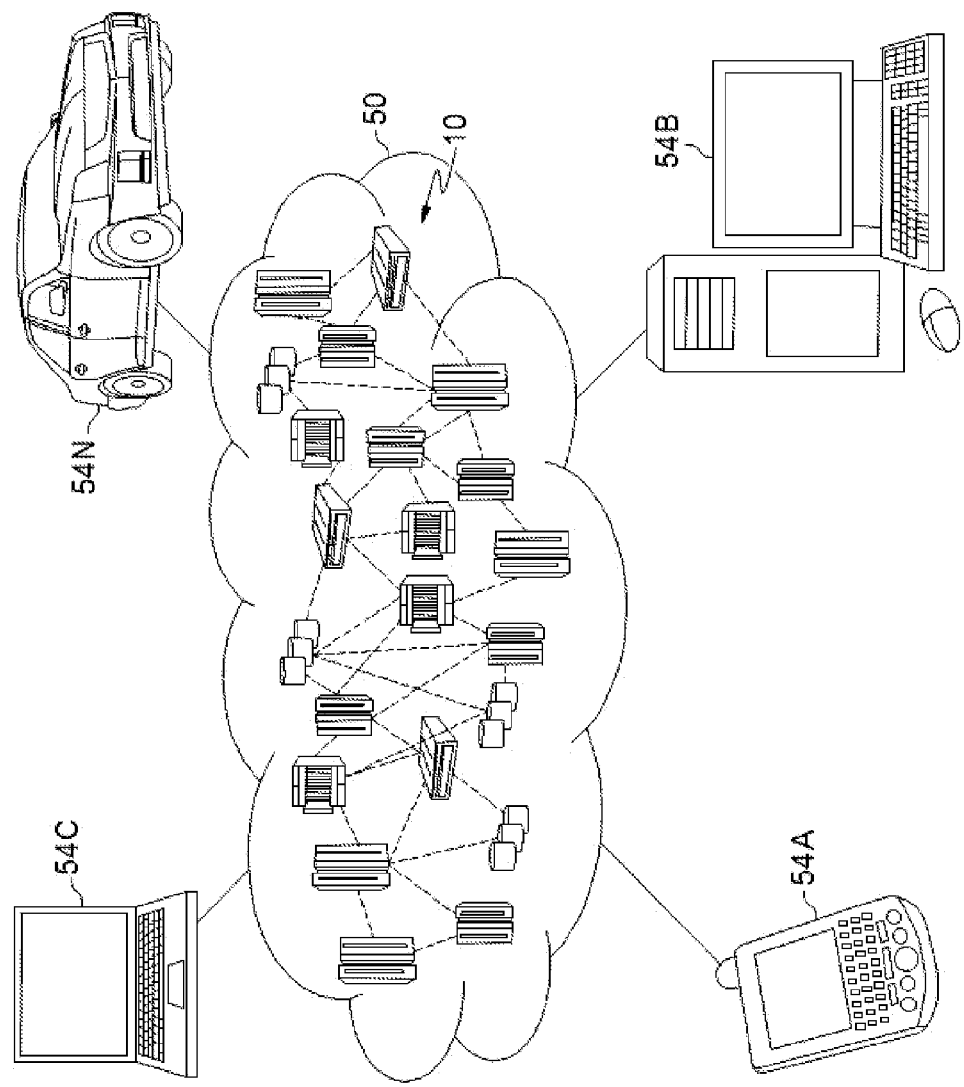
FIG. 6 depicts a cloud computing environment, according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
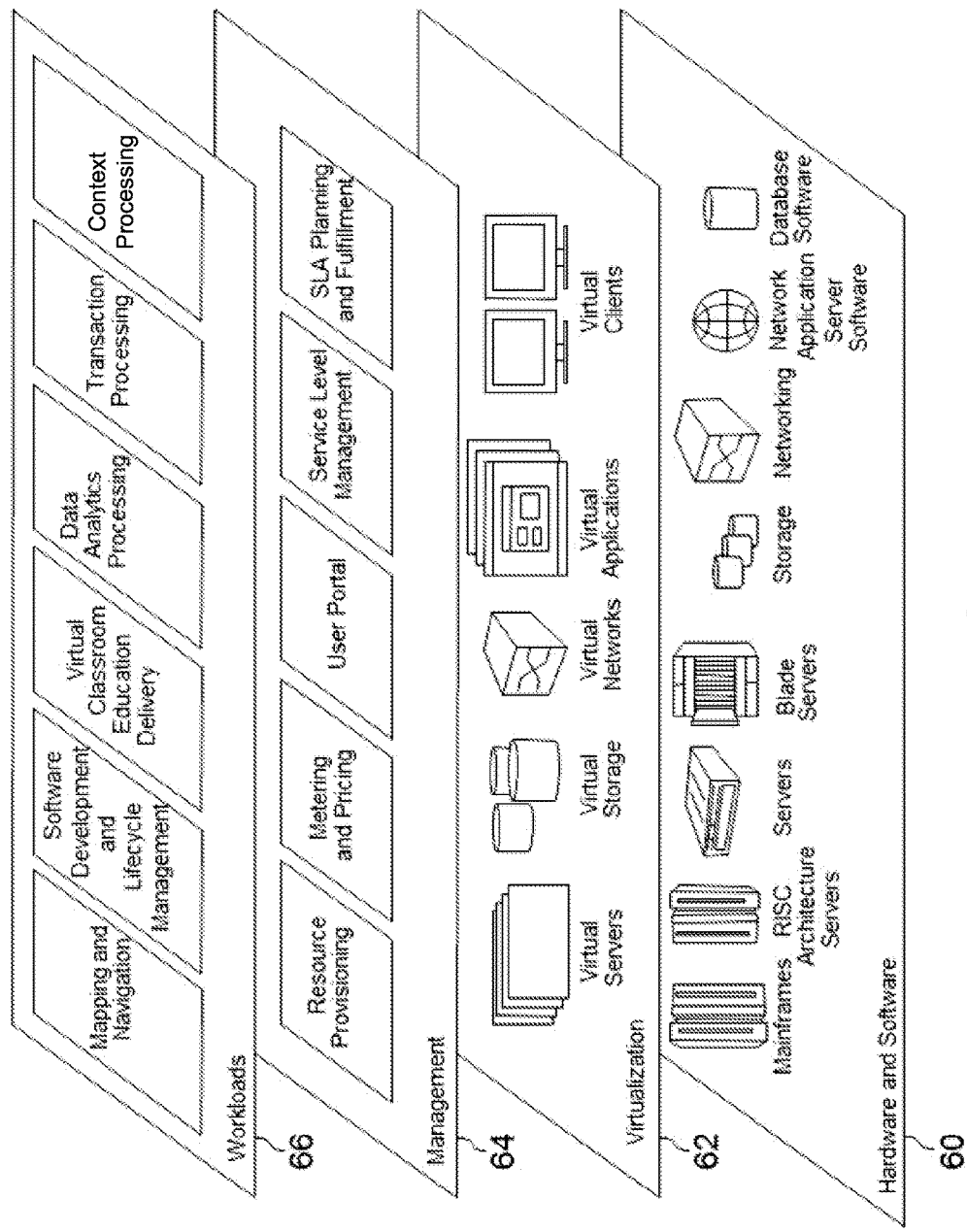
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto.

As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and context processing.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for re-launching contextually related applications, comprising:
   identifying, by one or more processors, one or more contextually-related applications based on receiving an indication from the user to save a current state of the one or more contextually-related applications, wherein the indication comprises one of: a time-out period, an automatic preference, and a manual selection;
   grouping, by one or more processors, the one or more contextually-related applications, wherein the identified contextually-related applications specifies applications required for an end to end task;
   automatically saving, by one or more processors, state information associated with the one or more contextually-related applications as a first profile, wherein the saved state information includes data shared or transferred between each application of the one or more grouped contextually-related applications;
   identifying, by one or more processors, input in an application to be related to a group of the grouping of the one or more contextually-related applications;
   identifying input in an application outside of the group to be related to the group of the grouping of the one or more applications; and
   in response to identifying input in an application outside of the group to be related to a group of the grouping of the one or more contextually-related applications, launching, by one or more processors, the group of the one or more contextually-related applications with each data field of the applications of the one or more contextually-related applications populated with the saved stated information in the first profile.

2. The method of claim 1, further comprising:
   after saving the group of one or more contextually-related applications as the first profile, detecting, by one or more processors, a context of an executed first application;
   determining, by one or more processors, whether the detected context of the executed first application is related to a context of the group of one or more contextually-related applications, wherein the context refers to a shared end-to end task based, at least in part on the first profile; and
   in response to determining that the detected context of the executed first application is related to the context of the group of one or more contextually-related applications of the first profile, launching, by one or more processors, the group of the one or more contextually-related applications of the first profile.

3. The method of claim 1, wherein the one or more contextually-related applications comprise information detailing: a webpage, a text message, an e-mail, a document, and user settings.

4. The method of claim 2, wherein a trigger to launch the group of the one or more contextually-related applications comprises: an automatic trigger in response to the execution of the first application, which is determined to be contextually-related to the group of the one or more contextually-related applications.

5. The method of claim 1, wherein saving, by one or more processors, the group of the one or more contextually-related applications as a first profile comprises:
receiving, by one or more processors, a user selection to exclude at least one application from the indication to save the state of the one or more contextually-related applications.

6. The method of claim 1, wherein launching the group of the one or more contextually-related applications comprises:
accessing, by one or more processors, data associated with the one or more contextually-related applications, wherein the data associated with the one or more contextually-related applications comprises search criteria, keywords, and input data;
retrieving, by one or more processors, updates to the one or more contextually-related applications from a source of the one or more contextually-related applications; and
displaying, simultaneously, by one or more processors, the saved state of the one or more contextually-related applications, wherein the saved state of the one or more contextually-related applications is updated at a time of the launching of the group of the one or more contextually-related applications, using the retrieved updates to the one or more contextually-related applications from the source, and wherein saving the group of one or more contextually-related applications as the first profile occurs before the launching of the group of the one or more contextually-related applications.

7. A computer program product for re-launching contextually related applications, comprising:
a computer readable storage medium and program instructions, executable by a processor, stored on the computer readable storage medium, the program instructions comprising:
program instructions to identify one or more contextually-related applications based on receiving an indication from the user to save a current state of the one or more contextually-related applications, wherein the indication comprises one of: a time-out period, an automatic preference, and a manual selection;
program instructions to group the one or more contextually-related applications, wherein the identified contextually-related applications specifies applications required for an end to end task;
program instructions to automatically save state information associated with the one or more contextually-related applications as a first profile, wherein the saved state information includes data shared or transferred between each application of the one or more grouped contextually-related applications;
program instructions to identify input in an application to be related to a group of the grouping of the one or more contextually-related applications;
program instructions to identify input in an application outside of the group to be related to the group of the grouping of the one or more applications; and
program instructions to, in response to identifying input in an application outside of the group to be related to a group of the grouping of the one or more contextually-related applications, launching, by one or more processors, the group of the one or more contextually-related applications with each data field of the applications of the one or more contextually-related applications populated with the saved stated information in the first profile.

8. The computer program product of claim 7, further comprising:
after saving the group of one or more contextually-related applications as the first profile, program instructions to detect a context of an executed first application;
program instructions to determine whether the detected context of the executed first application is related to a context of the group of one or more contextually-related applications, wherein the context refers to a shared end-to end task based, at least in part on the first profile; and
program instructions to, in response to determining that the detected context of the executed first application is related to the context of the group of one or more contextually-related applications of the first profile, launch the group of the one or more contextually-related applications of the first profile.

9. The computer program product of claim 7, wherein the one or more contextually-related applications comprise information detailing: a webpage, a text message, an e-mail, a document, and user settings.

10. The computer program product of claim 8, wherein a trigger to launch the group of the one or more contextually-related applications comprises: an automatic trigger in response to the execution of the first application, which is determined to be contextually-related to the group of the one or more contextually-related applications.

11. The computer program product of claim 7, wherein the program instructions to save the group of the one or more contextually-related applications as a first profile comprises:
program instructions to receive a user selection to exclude at least one application from the indication to save the state of the one or more contextually-related applications.

12. The computer program product of claim 7, wherein the program instructions to launch the group of the one or more contextually-related applications, comprises:
program instructions to access data associated with the one or more contextually-related applications, wherein the data associated with the one or more contextually-related applications comprises search criteria, keywords, and input data;
program instructions to retrieve updates to the one or more contextually-related applications from a source of the one or more contextually-related applications; and
program instructions to display, simultaneously, the saved state of the one or more contextually-related applications, wherein the saved state of the one or more contextually-related applications is updated at a time of the launching of the group of the one or more contextually-related applications, using the retrieved updates to the one or more contextually-related applications from the source, and wherein the program instructions to save the group of one or more contextually-related applications as the first profile are executed before the program instructions to launch of the group of the one or more contextually-related applications.

13. A computer system for re-launching contextually related applications, comprising:
one or more computer processors;
one or more computer readable storage media;

program instructions stored on the one or more computer readable storage media for execution by at least one of the one or more processors, the program instructions comprising:

program instructions to identify one or more contextually-related applications based on receiving an indication from the user to save a current state of the one or more contextually-related applications, wherein the indication comprises one of: a time-out period, an automatic preference, and a manual selection;

program instructions to group the one or more contextually-related applications, wherein the identified contextually-related applications specifies applications required for an end to end task;

program instructions to automatically save state information associated with the one or more contextually-related applications as a first profile, wherein the saved state information includes data shared or transferred between each application of the one or more grouped contextually-related applications;

program instructions to identify input in an application to be related to a group of the grouping of the one or more contextually-related applications;

program instructions to identify input in an application outside of the group to be related to the group of the grouping of the one or more applications; and program instructions to, in response to identifying input in an application outside of the group to be related to a group of the grouping of the one or more contextually-related applications, launching, by one or more processors, the group of the one or more contextually-related applications with each data field of the applications of the one or more contextually-related applications populated with the saved stated information in the first profile.

14. The computer system of claim 13, further comprising:

after saving the group of one or more contextually-related applications as the first profile, program instructions to detect a context of an executed first application;

program instructions to determine whether the detected context of the executed first application is related to a context of the group of one or more contextually-related applications, wherein the context refers to a shared end-to end task based, at least in part on the first profile; and program instructions to, in response to determining that the detected context of the executed first application is related to the context of the group of one or more contextually-related applications of the first profile, launch the group of the one or more contextually-related applications of the first profile.

15. The computer system of claim 13, wherein the one or more contextually-related applications comprise information detailing: a webpage, a text message, an e-mail, a document, and user settings.

16. The computer system of claim 13, wherein the program instructions to save the group of the one or more contextually-related applications as a first profile comprises:

program instructions to receive a user selection to exclude at least one application from the indication to save the state of the one or more contextually-related applications.

17. The computer system of claim 13, wherein the program instructions to launch the group of the one or more contextually-related applications, comprises:

program instructions to access data associated with the one or more contextually-related applications, wherein the data associated with the one or more contextually-related applications comprises search criteria, keywords, and input data;

program instructions to retrieve updates to the one or more contextually-related applications from a source of the one or more contextually-related applications; and program instructions to display, simultaneously, the saved state of the one or more contextually-related applications, wherein the saved state of the one or more contextually-related applications is updated at a time of the launching of the first set of the one or more contextually-related applications, using the retrieved updates to the one or more contextually-related applications from the source, and wherein the program instructions to save the group of one or more contextually-related applications as the first profile are executed before the program instructions to launch of the group of the one or more contextually-related applications.

* * * * *